Nov. 4, 1958    M. R. SMITH    2,859,175
USE OF PRODUCT GASES IN A FLUIDIZED CONVERSION PROCESS
Filed Nov. 16, 1954
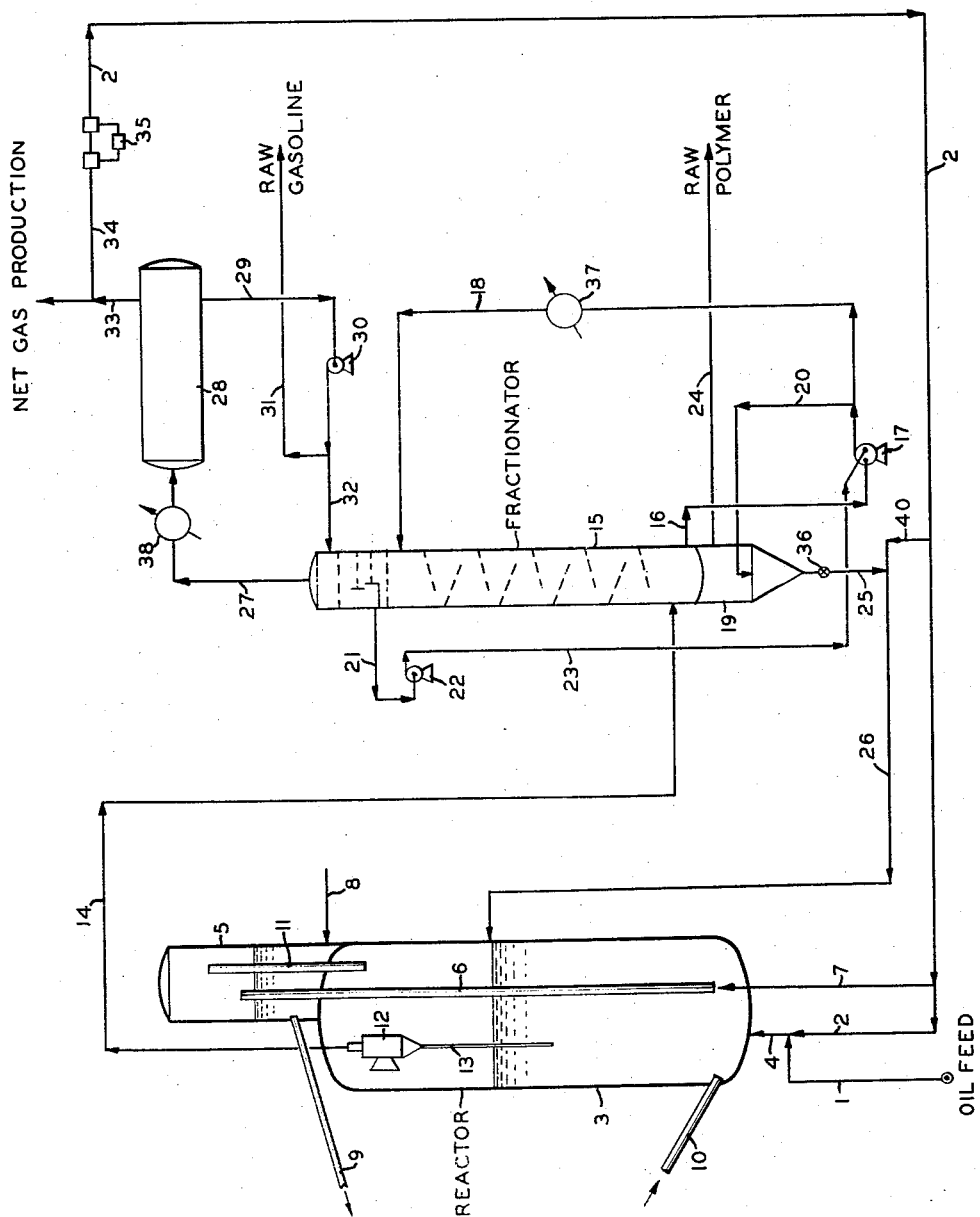
INVENTOR.
MARTIN R. SMITH
BY
ATTORNEYS UnitedStates Patent Office 2,859,175
Patented Nov. 4, 1958

2,859,175

USE OF PRODUCT GASES IN A FLUIDIZED CONVERSION PROCESS

Martin R. Smith, Glen Ridge, N. J., assignor to The M. W. Kellogg Company, Jersey City, N. J., a corporation of Delaware Application November 16, 1954, Serial No. 469,255

3 Claims. (Cl. 208—136)

This invention relates to an improved method of recovering entrained catalyst fines from a vaporous reaction product of a hydrocarbon conversion process. More particularly, it relates to a method of recovering entrained catalyst fines from the reaction product of a hydroforming reaction. Still more particularly, it relates to an improved method of returning such fines to the reaction zone as an oil slurry.

In hydroforming, as in other fluidized hydrocarbon conversion reactions, a major problem exists with regard to catalyst recovery. Even though separation is carried out in a settling zone and by means of cyclone separators, a certain amount of catalyst fines invariably escape from the reactor with the vaporous reaction products. Recovery of these entrained catalyst fines becomes a matter of economic importance in large scale operations and various means have been proposed previously for their recovery. One of the most frequently used methods involves returning catalyst fines to the reactor as an oil slurry. The oil used to form this catalyst slurry may be obtained from an external source or may be part of the feed or reaction products. For various reasons, such methods have not been entirely satisfactory.

Vaporous reaction products of hydroforming reactions include normally gaseous material, gasoline, polymer and entrained catalyst particles. It has been the custom in the past to pass the reaction product to a fractionator where liquid polymer is separated from gasoline and normally gaseous products. The polymer is then used, in the same tower, to scrub entrained catalyst particles from the other reaction products. Polymer and catalyst fines are withdrawn from the fractionation zone and introduced into a settling zone where catalyst fines settle as a slurry and supernatant liquid polymer is drawn off. The slurry of catalyst fines is then returned to the reaction zone by means of a mechanical pump.

There are several serious disadvantages to this method of recovering catalyst fines. One of these disadvantages is that there is a strong tendency for catalyst fines to settle from the slurry in the transfer line to the reactor. If left unchecked, this tendency would soon result in complete plugging of the slurry transfer line. To avoid this eventuality, past practice has dictated the use of larger amounts of oil vehicle than would be otherwise desirable. The use of excessive amounts of oil vehicle, while alleviating the problem of catalyst settling in the transfer line produces other undesirable results, all of which are attributed to the greater amount of reactor effluent produced by the extra oil vehicle. The most immediate effect of a greater amount of reactor effluent is an increase in the amount of catalyst entrainment. The additional catalyst thus entrained places an extra burden on the cyclone separators and aggravates the original problem of catalyst fines recovery. An increased amount of reactor effluent also requires the construction of a larger fractionator, and, in addition, increases the danger of condensation in the reactor effluent heat exchangers. I have discovered a method of recovering catalyst fines and returning them to the reactor which substantially alleviates these disadvantages.

It is an object of this invention to provide an improved method of recovering entrained catalyst fines from the reaction product of hydrocarbon conversion processes.

Another object of this invention is to provide an improved method of recovering entrained catalyst fines from the reaction product of a fluid hydroforming process.

A further object of this invention is to provide an improved method of recovering entrained catalyst fines from the reaction product of a fluid hydroforming process and returning them to the reaction zone as an oil slurry.

Other objects and advantages will become apparent from the following explanation and description of my invention.

By means of my invention, it is contemplated to recover catalyst fines entrained in the reaction product of a hydrocarbon conversion process as an oil slurry and to inject a normally gaseous material into said slurry to assist in returning the same to the reaction zone.

In a particular aspect of this invention, a vaporous reaction product containing high boiling normally liquid material, relatively lower boiling normally liquid material, normally gaseous material and entrained catalyst fines, and which has been discharged from a hydrocarbon conversion zone, is treated for the recovery of fines by the method which comprises condensing at least a portion of the high boiling liquid product, scrubbing catalyst fines from the vaporous reaction product with high boiling liquid product, separating normally gaseous material from the reaction product, forming a slurry of fines in high boiling liquid product and recycling the oil slurry thus formed to the conversion zone by injecting at least a portion of normally gaseous material into said slurry and passing the same through a transfer zone leading to the conversion zone.

The present invention is applicable to any hydrocarbon conversion process in which particles of catalyst entrained in the reactor effluent are recovered and returned to the reactor as an oil slurry. While it can be utilized in such processes as reforming, dehydrogenation, hydrogenation, desulfurization, catalytic cracking, isomerization, etc., my invention is particularly applicable to the hydroforming process. In hydroforming processes a polymer boiling above the gasoline range is produced which can be used to scrub the catalyst fines from the vaporous reaction product and then readily used as the oil vehicle for returning the slurry of recovered catalyst fines to the reaction zone. The hydroforming process also produces an excess of normally gaseous product containing hydrogen and light hydrocarbons which can be utilized in the transfer of catalyst slurry in accordance with the invention.

While the oil vehicle and the gaseous material used in the return of recovered fines to the reaction zone can be derived from the process employing the same, it is also intended to make use of other suitable oil vehicle and normally gaseous material. The oil vehicle used in the slurry transfer line can, for example, be any high boiling hydrocarbon oil which is liquid at the conditions of temperature and pressure to be found in the slurry transfer line. Further, the gaseous material to be injected into the slurry can be any material which is gaseous at the conditions of temperature and pressure to be found in the slurry transfer line, and it can be for example, flue gas, steam, carbon dioxide, etc. Product gas of the hydrocarbon conversion process which contains normally gaseous hydrocarbons and hydrogen is particularly suitable for injection into the catalyst slurry.

In the hydroforming process a light hydrocarbon oil, e. g., gasoline or naphtha, is contacted with a dense bed of finely divided reforming material under conditions suitable for producing a product of high anti-knock quality, the concentration of finely divided solid material entrained in the gaseous material usually varies from about 0.1 to 100 grains, more usually about 0.5 to 15 grains of solids per cubic foot of gaseous material. The hydroforming process is carried out at a temperature of about 750 to about 1050° F., more usually about 850 to about 950° F. and a pressure of about 25 to about 1000 p. s. i. g., more usually about 50 to about 500 p. s. i. g. The total pressure of the reaction is maintained for the purpose of providing a hydrogen partial pressure which is advantageous for suppressing carbon or coke formation. The hydrogen supplied to the reforming zone is from about 500 to about 20,000 standard cubic feet (measured at 60° F., and 760 mm. Hg pressure) per barrel, abbreviated as "s. c. f. b.," more usually about 1000 to about 7500 s. c. f. b. The quantity of oil being processed relative to the quantity of catalyst which is present in the reaction zone is designated in terms of the weight space velocity, which is measured as the pounds of oil feed on an hourly basis per pound of catalyst which is present in the reaction zone. The weight space velocity varies from about .05 to about 10 lb./hr./lb. more usually about 0.1 to about 2.5 lb./hr./lb. The process can be operated as either a fixed or moving bed system using fluidized catalyst. In the moving bed system the relative weight of catalyst being circulated to oil charge is measured on a weight basis and, generally, it can be about .05 to about .15, usually about 0.1 to about 2.0. Usually, the process is operated under such conditions that there is a net production of hydrogen and there is no need to use an extraneous source of hydrogen to maintain the process.

Any suitable reforming catalyst can be used in the process. Catalysts having aromatization or dehydrogenation-hydrogenation properties, for example, are suitable. Examples of catalysts which can be used for this purpose are compounds of metals in groups V and VI of the periodic table; more particularly, the oxides and/or sulfides of the left hand elements of groups V and VI of the periodic table. Another suitable class of catalyst is the noble metals of group VIII of the periodic table, such as platinum and palladium. The heteropoly acids, such as those containing the elements molybdenum, tungsten, vanadium and chromium, can also be used for this purpose. Examples of the heteropoly acids are phosphomolybdic acid, silicomolybdic acid, aluminomolybdic acid, etc. The catalytic elements can be used either alone or supported on a carrier material such as alumina of the gel or non-gel type, silica, silica-alumina, bauxite, zinc aluminate, Superfiltrol, kieselguhr, pumice, etc. The catalytic element usually comprises about 0.01 to about 25% of the total catalyst, on a weight basis.

As previously indicated, in fluid hydroforming, the reaction product comprises normally gaseous product, gasoline and polymer. The gasoline product is normally a liquid which has an initial boiling point of about 85 to about 175° F. and an end point of about 350 to about 450° F., more usually an end point of about 400 to 425° F. The polymer is normally liquid and of a higher boiling range than the gasoline. Since the polymer contains a high concentration of aromatics of a highly refractive nature, it serves unusually well as a vehicle for recycling recovered catalyst fines to the reaction zone. The polymer is also used to quench the vaporous reaction product containing the entrained catalyst fines. The polymer can be used for this purpose many times without danger of becoming decomposed and contaminating the gasoline product. Quenching takes place in a suitable quenching zone or tower containing internal baffles over which polymer flows downwardly in countercurrent contact with the upflowing vaporous reaction product. The tower containing the scrubbing zone also may contain a fractionation zone for the separation of the polymer from the lighter boiling normally liquid product material. Scrubbing the vaporous reaction product with polymer results in wetting of the entrained catalyst particles and in condensation of vaporous polymer contained in the reaction product.

A mixture of polymer and catalyst fines is withdrawn from the scrubbing zone and further processed for separation of catalyst fines. In this regard, the mixture of polymer and catalyst fines is passed to a separation zone, e. g., a settling zone where the catalyst fines are allowed to settle to form a slurry and a liquid polymer of substantially reduced fines content is produced. Slurry is withdrawn from the separation zone and returned to the reaction zone. The density of catalyst in the slurry which is returned to the reaction zone can be expressed in terms of pounds of catalyst per gallon of oil vehicle. As mentioned previously, past practice has necessitated the use of relatively large quantities of oil vehicle in order to alleviate the tendency of the catalyst fines to settle out in the transfer line. The practice in the past has been to use a slurry comprising from about 0.5 to 1.0 lb. of catalyst per gallon of oil vehicle. In accordance with the present invention, a portion of the normally gaseous product from the hydroforming process is injected into the slurry to assist in returning the slurry to the reaction zone. The amount of gas so injected can vary widely i. e., in general, about 0.5 to about 10, and preferably from about 2 to about 5 s. c. f. (standard cubic feet measured at 60° F. and 760 mm. Hg) per lb. of slurry. Injecting gaseous material in this manner allows the use of relatively less oil vehicle in the slurry without danger of catalyst settling. In general, it is possible, with injection of gaseous material into the slurry, to operate successfully with between about 1.0 lb. and about 2.5 lb. of catalyst per gallon of oil vehicle in the slurry, more usually about 1.2 to 1.7, on the same basis.

It can be seen that injection of gaseous material into the recycle slurry substantially lessens the amount of oil vehicle needed in the slurry to prevent settling of the catalyst fines in the transfer line. In addition to the advantages gained by reduction of the total amount of reactor effluent, the use of less oil in the slurry results in less heat being required to supply the heat of vaporization for the oil when the slurry reaches the reaction zone.

It should be noted that the amount of oil in the recycle slurry can be further reduced by a pressure in the separation or settling zone substantially above the pressure in the reaction zone. A substantially higher pressure in the separation or settling zone than in the reaction zone will assist in returning slurry to the reaction zone, and further, such a pressure differential will allow the use of higher concentrations of catalyst in the slurry without undue settling of catalyst fines. The use of pressure differential alone for this purpose, however, has serious disadvantages which are not present in the practice of my invention. In the case of pressuring the slurry to the reaction zone without the use of gas injection, serious erosion occurs at the point where the pressure is reduced. In order to prevent settling of catalyst fines by the present invention, the linear velocity of the slurry is maintained at a minimum value depending on the concentration of catalyst fines in the slurry. If the linear velocity becomes too low for a given slurry concentration, settling of catalyst fines will occur. The higher the concentration of catalyst fines in the material passing through the transfer zone or line, the higher will be the linear velocity needed to prevent settling. The net effect of injecting gaseous material into the slurry is to lower the concentration of catalyst in the material passing through the transfer zone or line, and thus reduce the tendency for settling. The use of a substantial pressure differential will operate to reduce the amount of gas material injected, but it is undesirable to rely solely on pressure differential because the advantage of the present invention resides in substituting gaseous material for liquid and not in merely effecting an increase in linear velocity. A high pressure differential is undesirable, because the resulting pressure drop across the required pressure reducing valve in the transfer zone or separation zone causes severe erosion and necessitates frequent replacement of this equipment. As a practical matter, it has been found that, generally, a pressure differential of not more than about 50 p. s. i. is desirable from the standpoint of erosion, more usually about 15 to 35 p. s. i. A further disadvantage in using high pressure differentials alone for the purpose intended lies in the size of pipe required for the transfer. Higher velocities require smaller sizes of pipe for the transfer of equal amounts of slurry. Since the amount of catalyst fines being returned is usually small, high pressure differentials may result in the necessity of using pipe of an impractically small internal diameter. In addition, the problem of catalyst settling would be aggravated by extremely small pipes since such pipes would plug more readily than larger ones. In accordance with this invention, the gaseous material is injected into the transfer line or zone containing slurry in an amount to provide a superficial linear velocity of about 10 to 50 feet per second, more usually about 15 to 30 feet per second.

From the foregoing, it should be apparent that injection of gaseous material into the slurry in accordance with my invention will reduce the pressure needed in the separation zone to return slurry of a given concentration of catalyst to the reaction zone. It will also be apparent that injection of gaseous material into the slurry in accordance with my invention, brings about a definite improvement in allowable concentration of catalyst in slurry.

In order to provide a better understanding of this invention, reference will be had to the accompanying drawing which illustrates a preferred embodiment thereof.

In the drawing, vaporized naphtha feed oil having an API gravity of 56.3° enters through line 1 at the rate of 12,780 b. p. s. d. and a temperature of 995° F. The vaporous feed enters reactor 3 through line 4 together with hydrogen containing recycle gas supplied through line 2 at the rate of 4,400 s. c. f./b. b. l. and a temperature of 1200° F. In reactor 3, the reactant vapors are contacted with a fluidized bed of finely divided molybdenum trioxide on alumina catalyst, containing 9% by weight of molybdenum trioxide, at an average reaction temperature of 910° F., a reaction pressure of 250 p. s. i. g., a catalyst to oil ratio of about 1.4 and a weight space velocity of 0.7. Catalyst is continuously withdrawn from the dense phase of reactor 3 and passed to stripper 5 through line 6 by means of lift gas supplied through line 7. In stripper 5, the catalyst is stripped by stripping gas, e. g., steam, admitted through line 8. From the dense phase of stripper 5, catalyst is withdrawn through line 9 and passed to a regeneration zone (not shown). Regenerated catalyst is introduced to reactor 3 through line 10. Gases from the dilute upper phase of stripper 5 are returned to reactor 3 through line 11.

The vaporous reaction product is passed through cyclone separator 12 where the majority of the entrained catalyst is removed and returned to the dense phase of reactor 3 through line 13.

Vaporous reaction product consisting of normally gaseous material, gasoline, polymer and entrained catalyst fines leaves the cyclone separator 12 and is passed to fractionator 15 through line 14. Fractionator 15 is operated at a pressure of 240 p. s. i. g. In fractionator 15, polymer and part of the gasoline is condensed from the reaction product. This is effected by upwardly flowing vaporous product being countercurrently contacted with downwardly flowing polymer. Liquid polymer and catalyst fines are withdrawn from the bottom of fractionator 15 and passed through line 16 to pump 17. From pump 17 a portion of the mixture of polymer and catalyst fines is returned to the upper part of fractionator 15 through line 18 and cooler 37, and the remaining portion is passed to settler 19 through line 20. Flush oil for pump 17 is obtained from the upper portion of fractionator 15 by means of line 21, pump 22, and line 23. In settler 19, catalyst fines settle out of the liquid polymer to form a slurry in the lower part of said zone while a layer of supernatant liquid polymer of substantially reduced catalyst fines content forms in the upper part of said zone. Settler 19 is maintained at a pressure of 280 p. s. i. g. 283 b. p. s. d. of raw polymer product with an API gravity of 35.0° is withdrawn from settler 19 through line 24. A slurry of catalyst fines and polymer containing 1.5 lb. of catalyst fines per gallon of polymer is withdrawn from the bottom of settler 19 through pressure reducing valve 36, and line 25 into line 26 where recycle gas obtained from line 40 is injected into said slurry at the rate of 3.2 s. c. f. per lb. of slurry. 43 b. p. s. d. of slurry having an API gravity of 35.0° and at a temperature of 380° F. are returned to reactor 3 through line 26 at a linear velocity of about 15 feet per second.

Vaporous reaction product passes from the top of fractionator 15 through line 27 and cooler 38 into separator 28 where raw gasoline is condensed and the normally gaseous products are separated. Raw gasoline is withdrawn from separator 28 through line 29 to pump 30. From pump 30, 11,450 b. p. s. d. of raw gasoline having an API gravity of 54.4° pass out through line 31 and an equal amount of said gasoline is returned to fractionator 15 through line 32. Normally gaseous products are withdrawn from separator 28 through line 33. A portion of said gaseous products is passed through line 34 to pump 35 and is recycled to the process through line 2. The remainder of said gaseous products constitutes the net gas production of the process.

In the foregoing description of a preferred embodiment of my invention, certain conventional equipment such as heat exchangers, valves, furnaces, etc., has not been shown. Such equipment can be easily supplied as required by anyone familiar with the art and my disclosure should be read as including such conventional equipment as may be convenient or necessary.

I claim:

1. A hydroforming process which comprises contacting hydrocarbon oil with a dense fluid bed of finely divided hydroforming catalyst under suitable hydroforming conditions in a reaction zone to produce a vaporous reaction product containing normally gaseous material, gasoline, polymer and entrained catalyst fines, separating polymer from said reaction product, separating normally gaseous material from said reaction product, scrubbing fines from the reaction product with polymer, separating polymer containing catalyst fines from the bulk of the polymer in a settling zone maintained at a pressure of between about 15 and about 35 p. s. i. greater than the pressure maintained in the reaction zone, injecting a portion of said separated normally gaseous material into said slurry, and passing said slurry of catalyst fines and gaseous material to the reaction zone.

2. A hydroforming process which comprises contacting a vaporized naphtha feed with a dense fluid bed of finely divided catalyst comprising molybdenum trioxide supported on alumina at a pressure of about 50 to about 500 p. s. i. g., a temperature of about 850 to about 950° F., a catalyst to oil ratio of about 0.1 to about 2.0, a weight space velocity of about 0.1 to about 2.5 in the presence of added hydrogen in the amount of about 1000 to about 7500 s. c. f. b., thereby producing a vaporous reaction product containing normally gaseous material, gasoline, polymer and entrained catalyst fines, separating polymer from said reaction product, scrubbing fines from the reaction product with polymer, separating normally gaseous material from the reaction product, separating polymer containing catalyst fines from the bulk of the polymer in a settling zone maintained at a pressure of about 15 to about 35 p. s. i. greater than the pressure maintained in the reaction zone to form a slurry containing about 1.0 to about 2.5 lb. of catalyst per gallon of oil vehicle, injecting a portion of the gaseous material into said slurry of fines in an amount of about 2 to about 5 s. c. f. of the gaseous material per lb. of slurry, passing the slurry of fines and gaseous material to a transfer zone wherein the linear velocity is about 10 to about 50 ft. per sec., recycling the gaseous material and slurry from the transfer zone to the reaction zone, and recycling another portion of normally gaseous material to the reaction zone.

3. A process which comprises contacting hydrocarbon oil with a dense fluid bed of finely divided catalyst in a reaction zone to produce a vaporous reaction product containing normally gaseous material, gasoline, polymer and entrained catalyst fines, separating polymer from said reaction product, separating normally gaseous material from said reaction product, scrubbing fines from the reaction product with polymer, separating polymer containing catalyst fines from the bulk of the polymer in a settling zone maintained at a pressure of between about 15 and about 35 p. s. i. greater than the pressure maintained in the reaction zone, injecting a portion of said separated normally gaseous material into said slurry, and passing said slurry of catalyst fines and gaseous material to the reaction zone.

References Cited in the file of this patent

UNITED STATES PATENTS

| | | |
|---|---|---|
| 2,421,651 | Reeves | June 3, 1947 |
| 2,663,676 | Cardwell et al. | Dec. 22, 1953 |
| 2,665,239 | Howard et al. | Jan. 5, 1954 |
| 2,689,209 | Blair | Sept. 14, 1954 |